March 29, 1927.
E. WILDHABER
METHOD OF PRODUCING GEARS
Filed May 11, 1925
1,622,555
2 Sheets-Sheet 1
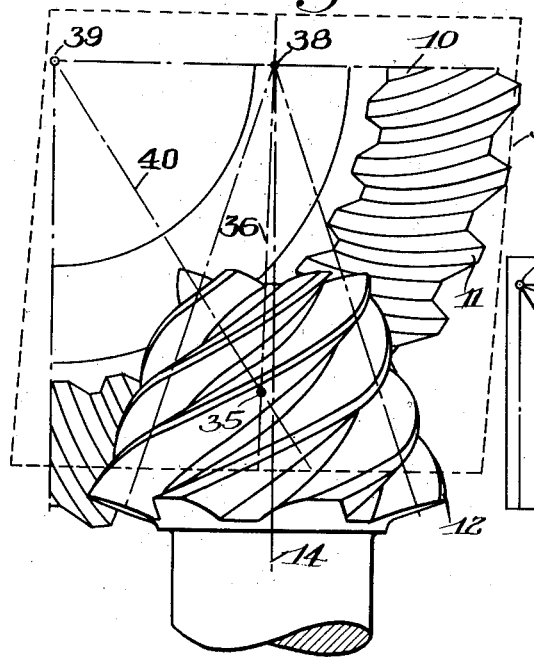
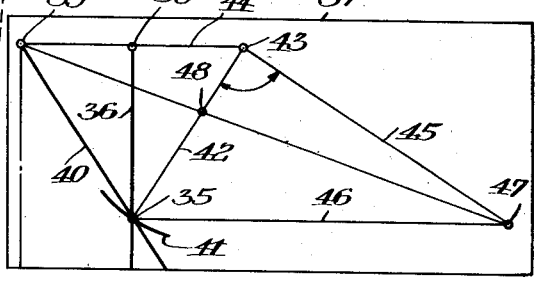
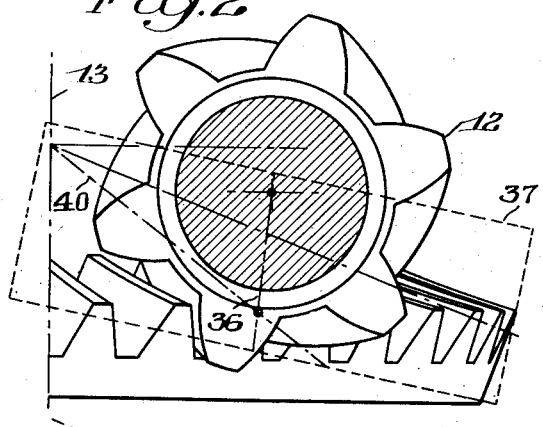
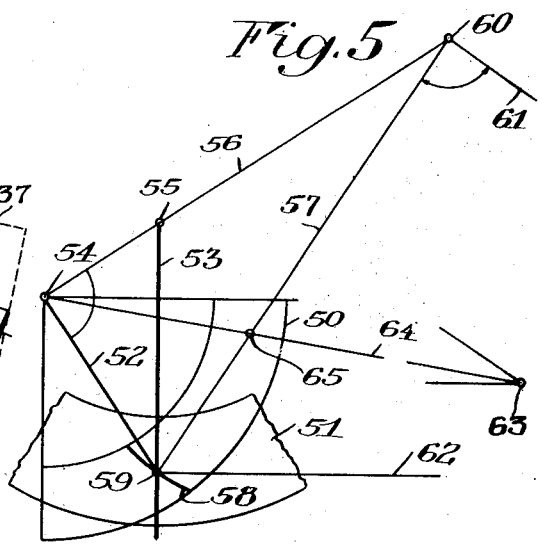
Inventor
Ernest Wildhaber
By B. Schlesinger
his Attorney March 29, 1927.  1,622,555
E. WILDHABER
METHOD OF PRODUCING GEARS
Filed May 11, 1925  2 Sheets-Sheet 2
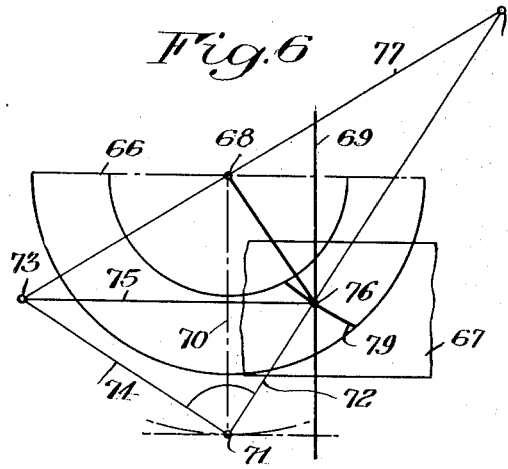
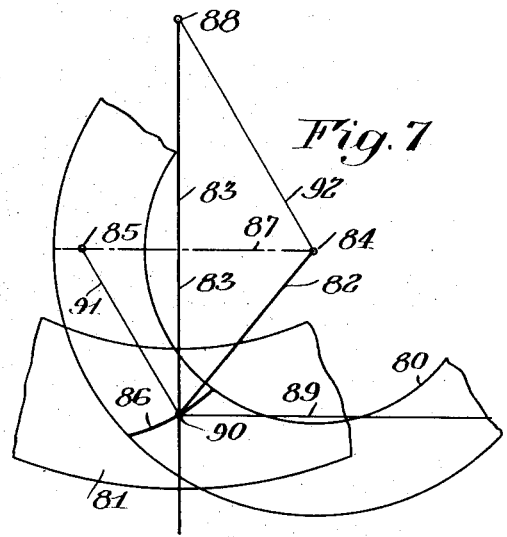
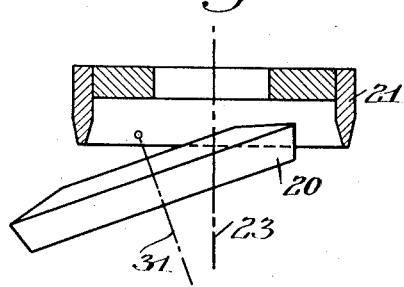
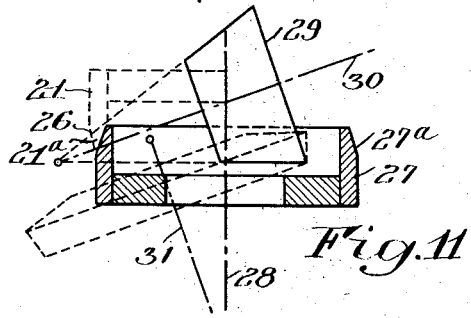
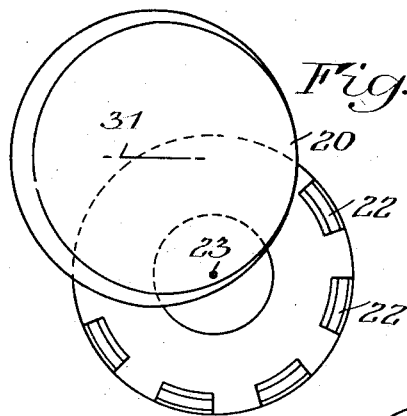
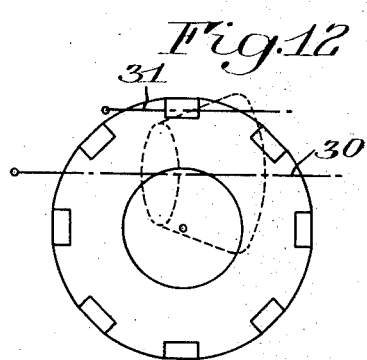
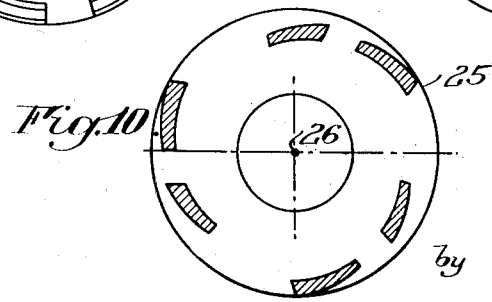
Inventor
Ernest Wildhaber
by B. E. Shlesinger
his Attorney Patented Mar. 29, 1927.

1,622,555

UNITED STATES PATENT OFFICE.

ERNEST WILDHABER, OF ROCHESTER, NEW YORK, ASSIGNOR TO GLEASON WORKS, OF ROCHESTER, NEW YORK, A CORPORATION OF NEW YORK.

METHOD OF PRODUCING GEARS.

Application filed May 11, 1925. Serial No. 29,552.

The present invention relates to gears and to a method for producing the same. In particular this invention relates to gears having axes non-intersecting and non-parallel.

One object of the present invention is to provide a pair of gears which will combine the smoothness of operation, characteristic of curved tooth gears, with the adaptability of gears which mesh with their axes non-intersecting and non-parallel.

A further object of the invention is to provide a pair of gears, provided with longitudinally curved teeth, and adapted to operate with axes non-intersecting and non-parallel, which can be readily produced and with a minimum of expense.

Other objects of the invention will be apparent in the course of the specification and from the recitation of the claims.

With the above and other objects in view the invention resides in the various novel features peculiar to the new gears and in the various novel steps included in the process for producing the same, which are described, hereinafter, in the specification, illustrated in the accompanying drawings and pointed out in the claims appended hereto.

In the drawings:

Figure 1 is a fragmentary plan view, illustrating a pair of gears constructed according to one embodiment of my invention.

Figure 2 is an end view of the pair shown in Figure 1.

Figure 3 is an axial section of the gear, or larger member of the pair, illustrated in Figures 1 and 2.

Figure 4 is a diagrammatic view, showing the relations and proportions of two gears constructed according to the preferred form, when developed into a plane tangent to their respective pitch surfaces.

Figures 5, 6 and 7 are diagrammatic views similar to Figure 4 illustrating various embodiments of the invention.

Figures 8 and 9 are respectively schematic section and plan views, showing the method by which the gears of this invention may be produced.

Figure 10 is a plan view of a tool which may be used to produce gears or pinion according to one embodiment of my invention.

Figure 11 is a view showing diagrammatically the method of producing the pinion.

Figure 12 is a plan view showing the location of the tool and pinion blank, shown more particularly in Figure 11.

The superiority of curved tooth bevel gears to straight tooth gears of the same type is well recognized and is borne out by their almost universal adoption as the final drive for automobiles. Ordinary curved tooth bevel gears are restricted in their use, however, to drives in which the axes are intersecting.

The present invention aims to make available the qualities which characterize curved tooth bevel gears in a drive in which the mating gears are arranged with axes non-intersecting and non-parallel and in which such mating gears are of comparatively simple structure and may be produced at a comparatively low cost. In the new pair, one member will have a substantially constant profile and the other member will be made conjugate to it. The uniformity of profile will mean that the pressure angle of the teeth is substantially the same at both ends thereof. One member of the new pair moreover and preferably the larger member will, preferably, also, be formed by a method in which the cutting edge contacts the whole finished tooth surface i. e. one member will preferably be non-generated, the generating process being confined to one member of the pair only. This means a great saving in time and in cost of production.

The new gears will resemble curved tooth bevel gears in certain respects and worm gears in others. Besides this, they have certain characteristics of their own. They will slide while in mesh, thus tending to quietness and to preserve the desired tooth forms. They have the further advantage that the pinion may be increased in size and strength over a corresponding bevel pinion of the same ratio, which makes them especially valuable at large ratios.

These new gears will preferably be so proportioned as to have contact substantially along the entire tooth surface of one member of the pair, whereby the teeth of both members will have added strength, the teeth of one member along its entire length, matching the spaces of the other member, the width of the teeth of one member being throughout their length substantially equal to the width of the tooth spaces of the other member. The new gears, accordingly, will have increased life, increased strength, can be produced more readily and will have greater quietness than hypoid gears of types heretofore known.

Referring to Figures 1, 2 and 3, where a pair of gears produced according to one embodiment of my invention is shown, it will be seen that the gear 10 is provided with curved teeth 11 which are of constant profile throughout their length. The pinion 12 is also provided with curved teeth, and is so placed with respect to the gear 10 that the axes 13 and 14 of gear and pinion, respectively, are offset from each other.

As already stated, the gear or larger member of the pair is preferably non-generated and the pinion is produced by a molding-generating process in which the pinion blank is rolled with reference to a tool representing the gear, in the manner of a pinion rolling with its mate. Hence there will be a saving in time and cost over present generating processes as applied to bevel gears with curved teeth.

One method of producing a pair of curved tooth gears according to this invention is illustrated in Figures 8 to 12. For producing the gear the blank 20 may be held stationary and the tool 21 consisting preferably of a rotary cutter having its cutting blades 22 projecting from a plane face such as the cutter described more particularly in Patent No. 1,236,834 granted to James E. Gleason, August 14, 1917, is rotated about its axis 23, while in engagement with the blank, thus sweeping out a curved tooth space in the blank. The blank is then indexed and a different tooth space then produced.

Another method for producing the gear consists in using a tool 25 such as that illustrated in Figure 10 and imparting to the blank a continuous indexing motion. The tool of the figure is more particularly described in the patent to Gleason and Stewart 1,249,378, Dec. 11, 1917. Such a tool will be rotated about its own axis 26, while the blank instead of being held stationary as with the tool 21 is also rotated about its axis and in timed relation with the rotation of the tool so that the cutting blades of the tool will enter different and preferably successive tooth spaces in the blank. The teeth on the blank will thus be all finished simultaneously.

The pinion will be produced by rotating a blank about its axis while in engagement with a tool representing the mate gear or wheel and will in addition be given a movement relative to the tool about a second axis representing the axis of said mate gear, while the axis of the pinion blank is maintained in proper offset relation to the imaginary axis of said mate gear. The pinion will be cut with a tool 27 having an effective cutting portion conjugate to the tool 21, where the tool 21 is employed to cut the gear. This arrangement is diagrammatically illustrated in Figure 11, where the cutting portion 27$^a$ of the tool 27 is shown conjugate to the cutting portion 21$^a$ of the tool 21. The pinion will be cut with a tool having an effective cutting portion conjugate to the tool 25, when the latter is used to cut the gear. The method of producing a pinion is diagrammatically illustrated in Figures 11 and 12 where the tool 27 conjugate to the tool used to cut the gear is rotated about its axis 28 while the blank 29 is rotated about its axis 30 and an additional relative movement between the tool and blank is effected about the axis 31 of the mate gear, the pinion axis 30 being maintained all the while in offset relation to the axis 31 of the mate gear. When the pinion is cut with a tool such as the tool 27, the rotation of the pinion blank will be in timed relation to the rotation of the tool, the blank being thereby constantly indexed and all the teeth finished simultaneously.

While a rotary cutter will preferably be used, it is evident that a single tool may be employed or any other form of tool which will produce the desired longitudinal tooth curvature. One side of a tooth space may be cut at a time or the tools 21 and 25 may be adapted to cut both sides simultaneously. The surface swept out by the method illustrated in Figures 8 and 9 will be a surface of revolution. The surface produced on the gear by the method described with relation to the tool shown in Figure 10 will approach a roulette curve and might be termed a modified roulette.

Gears produced according to this method may be of any suitable proportions. It is desirable, however, for the purposes of securing a drive in which both members of a pair have the requisite strength that the pair be so proportioned that the members thereof will contact along the entire tooth surface of one member of the pair. The pair will, therefore, preferably be proportioned according to the method disclosed in my companion application, Serial No. 29,553, filed May 11, 1925.

The cone angles, tooth numbers and offset of the gears of the pair have a definite relation. It can be demonstrated mathematically or graphically, as has been shown in the application above referred to and it will be clear from Figure 1 that the desired tooth contact can be obtained when the mesh between the gears 10 and 12 extends generally in the direction of the pinion axis 14. This mesh can be obtained when the axis 14 projected into a plane tangent to the pitch surfaces of gear and pinion at a common contact point 35 is tangent to the line of action between the two gears.

Assuming that the line of action is tangent to the projected pinion axis 36, the necessary data as to the proportioning of the two members of a pair of gears constructed according to the preferred form of this invention can be analyzed by considering their mesh in the plane 37 tangent to their pitch surfaces at the common contact point 35.

It can be demonstrated mathematically or graphically, as has been already shown in the said companion application, the normal to a tooth profile at a point of contact between two gears having axes non-intersecting and non-parallel may be considered as having an instantaneous axis which lies at the intersection of a perpendicular to said normal at the pitch point, or point of rolling contact between the two mating gears, with a line passing through the center of the longitudinal profile of the teeth of the gears and the center of the gear or wheel developed into the tangent plane. It can be demonstrated also, mathematically or graphically, as has been shown also in said companion application, that a tangent to the line of action between a pair of mating gears whose axes are non-intersecting and non-parallel is perpendicular to a radius drawn from said instantaneous axis.

To determine the required data to secure the desired tooth contact from the plane of the development, we may assume either the radius of the longitudinal profile or curvature of the gear or the distance of the pinion apex from the mean contact point 35, or another equivalent quantity, in addition to the tooth inclination or spiral angle.

Assuming the location of the pinion apex 38, 39 is the center or apex of the gear or wheel and 36 and 40 respectively, the projections of pinion and gear axes in said tangent plane 37. 41 may represent the pitch line of the gear or wheel and 42 a tooth normal at the point 35. The intersection point 43 between the line 44 connecting the centers or apexes 39 and 38, with the tooth normal 42 is the pitch point of the pair in development in the tangent plane.

By erecting a perpendicular 45 to the tooth normal 42 at the pitch point 43 and by intersecting same with a perpendicular 46 to the projected pinion axis 36 at the common contact point 35 we obtain the intersection point 47 which is the instantaneous axis of motion of the tooth normal. As previously stated a line drawn from this point 47 to the gear center 39 in the plane of the development intersects the tooth normal at the center 48 of the longitudinal tooth profile 41. The location of the tooth center can therefore be obtained from the plane of the development 37 and from this plane the necessary data as to the offset between the axes of the mating gears can also readily be determined. By assuming the location of the profile center it is obvious the location of the pinion apex might also be determined from the plane 37.

To determine the cone angles of the pair, let $a'$ be the cone angle of the gear and $a''$ be the cone angle of the pinion, $N'$ and $N''$ be the tooth numbers of gear and pinion repectively. In development the pitch surface of a gear will not occupy a full circumference. The tooth number of the full circumference, in development, bears the same relation to the actual tooth number $N'$ or $N''$ as the tooth number of a crown gear is to the tooth number of a bevel gear. Hence the tooth numbers of the full circumference, in development, of gear and pinion, respectively, are:

$$\frac{N'}{\sin a'} \text{ and } \frac{N''}{\sin a''}$$

The ratio of gear and pinion tooth numbers in development equals the ratio of the distances of the respective centers 39 and 38 from the pitch point 43. This known ratio is called A. Hence:

$$\frac{N'}{\sin a'} : \frac{N''}{\sin a''} = A \text{ or } \frac{N'}{N''} \cdot \frac{\sin a''}{\sin a'} = A$$

A further requirement is, that the axes of the pair, which are projected into lines 40 and 36, respectively, are at a given angle to each other, which is preferably a right angle. The arrangement of the gears with axes at right angles can be expressed by the formula:

$$\tan a' \times \tan a'' = \cos b, \quad (2)$$

where $b$ is the angle included between the projected axes 36 and 40.

These two equations furnish the following solution:

$$\sin^2 a'' = \sqrt{\frac{C_1^2}{4} + C_2} - \frac{C_1}{2} \quad (3)$$

where:

$$C_1 = \cotan^2 b \times \left[\left(\frac{N''}{N'}\right)^2 A^2 + 1\right]$$

$$C_2 = \cotan^2 b \times \left[\left(\frac{N''}{N'}\right)^2 A^2\right].$$

The cone angles $a''$ and $a'$ may therefore be determined from either equation (1) or (2).

From the plane of Figure 4 and from the above formulas the data for a pair of gears may be determined in such manner that the mesh between the same extends along the whole length of the gear teeth. This mesh will extend also over the whole or a large portion of the length of the pinion teeth.

The gears moreover will slide while in mesh, as required, and the teeth of one will match the tooth spaces of the other.

Gears whose axes are non-intersecting and non-parallel and whose contact is along the entire tooth surface of one member of the pair are superior in strength to bevel gears of the same ratio and because of their sliding engagement have longer wear and a tendency to preserve their required tooth forms throughout their life.

Figures 5, 6 and 7 illustrate diagrammatically various modifications of the invention shown in Figures 1 and 4. In Figure 5, 50 and 51 are parts of the developed pitch surfaces of a gear and a pinion, constructed according to this invention, whose axes are projected into lines 52 and 53 respectively. 54 is the apex or center of the gear or wheel and the apex 55 of the pinion has been so assumed in the shown embodiment as to be situated on a perpendicular 56 to the projected gear axis 52. This arrangement will mean that in actuality the apexes of gear and pinion are on the same level. By intersecting the line 56 with the line 57 normal to the tooth profile 58 at the contact point 59, we obtain the position of the pitch point 60. By erecting a perpendicular 61 to the normal 57 at the pitch point 60 and by intersecting said perpendicular 61 with a line 62 perpendicular to the projected pinion axis 53 at the point 59, the point 63 is located. This point 63 is the instantaneous axis of the normal 57. The line 64 connecting the point 63 and the gear apex 54 intersects the normal 57 at 65, which is the center of the profile 58. The cone angles and other data for a pair of gears constructed according to this embodiment may be obtained in the manner already described with reference to Figure 4.

Figure 6 illustrates diagramatically a pair in which one member is cylindrical. This member is somewhat similar in action to a worm or spur pinion. 66 and 67 are parts of the developed pitch surfaces of gear and pinion respectively. 68 and 69 are respectively the projected axes of gear and pinion. The apex of the pinion will be in infinity, the apex being located at the intersection point of the projected axis 69 with the line 70 connecting the center 68 of the gear with the pitch point 71. The line 70, therefore, will be parallel to the line 69. The pitch point 71 can be located by intersecting the normal 72 with the line 70. The point 73 which is the intersection point of the line 74, perpendicular to the normal 72 at the pitch point 71, with the line 75 drawn perpendicular to the projected pinion axis 69 at the contact point 76 is the instantaneous axis of the normal. The line 77 connecting this point 73 with the center of the gear 68 will intersect the normal 72 at the point 78 which is the center of the longitudinal tooth profile 79.

In the embodiment of my invention illustrated diagrammatically in Figure 7, 80 and 81 are parts of the developed pitch surfaces of gear and pinion respectively. 82 and 83 are the projected gear and pinion axes and 84 is the gear apex. The center 85 of the circular pitch line or longitudinal tooth profile 86 is assumed on the line 87 drawn perpendicular to the projected pinion axis 83. The apex 88 of the pinion can be located as follows: Line 87 is parallel to line 89 which is drawn perpendicular to the projected pinion axis 83 at the contact point 90. Lines 87 and 89 will intersect therefore only at infinity. The projection onto the tooth normal 91 of their intersection point is also infinitely far away. Hence the line 92 connecting the gear apex 84 and said projection point will be parallel to the normal 91. The line 92 will therefore intersect the projected pinion axis at its apex 88. It will be found that in this particular embodiment of my invention, the sines of the cone angles of the gear and pinion are in the exact proportion of their respective tooth numbers and moreover that the spiral teeth generated on the pinion by the method hereinbefore disclosed, to match the teeth 86 of the gear, approximate logarithmic spirals.

The data respecting any other pair of gears constructed according to this invention can be obtained in a manner similar to that described with reference to the embodiments herein disclosed. In any case we may assume either the center of the tooth profile or the location of the pinion apex and determine from the other data given the unknown quantity.

While I have illustrated certain preferred embodiments of my invention, it will be understood that this invention is capable of further modification within the limits of the disclosure and the scope of the appended claims. This application is intended to cover any variations, uses, or adaptations of my invention, following, in general, the principles of the invention and including such departures from the present disclosure as come within known or customary practice in gear cutting and may be applied to the essential features hereinbefore set forth and as fall within the scope of the appended claims.

Having thus described my invention what I claim is:

1. The method of producing a pair of gears which consists in forming the teeth of one of said gears by moving a tool in a curved path across the face of a gear blank and in producing the teeth of the other gear by moving a gear blank and a tool representing the first gear relatively to each other to produce longitudinally curved teeth on the blank while imparting a relative movement between the tool and blank in the manner of a gear rolling with the first gear and maintaining the axis of the blank offset from the axis of said first gear.

2. The method of producing a pair of gears which consists in forming one of the gears by moving a tool in a curved path across the face of a gear blank while imparting a continuous indexing rotation to the blank, and in producing the other gear by moving a tool representing the first gear in a curved path across the face of a gear blank while imparting a continuous indexing rotation to the blank and simultaneously producing a relative rolling movement between the tool and blank in the manner of a gear rolling with the first gear with its axis offset from the axis of the first gear.

3. The method of producing a pair of gears which consists in forming one of the gears by relatively moving a tool and a continuously rotating gear blank to produce teeth on the blank which are longitudinally curved and in producing the other gear by relatively moving a tool representing the first gear and a continuously rotating gear blank to produce teeth on the blank which are longitudinally curved while simultaneously imparting a relative rolling movement between the tool and blank in the manner of a gear rolling with the first gear with its axis offset from the axis of the first gear.

4. The method of producing a pair of gears which consists in forming the teeth of one gear by rotating a tool having its cutting edges projecting from a plane face in engagement with a gear blank and in producing the teeth of the other gear by rotating a tool having its cutting edges projecting from a plane face and representing the first gear, in engagement with a gear blank while imparting a relative rolling movement between tool and blank in the manner of a gear rolling with the first gear with its axis offset from the axis of the first gear.

5. The method of producing a pair of gears which consists in forming one gear by rotating a tool having its cutting edges projecting from a plane surface in continuous intermeshing engagement with a continuously rotating gear blank and in producing the other gear by rotating a tool having its cutting edges projecting from a plane surface in continuous intermeshing engagement with a continuously rotating gear blank while imparting relative rolling movement between tool and blank continuously in one direction in the manner of a gear rolling with the first gear with its axis offset from the axis of the first gear.

6. The method of producing gears which consists in rotating a tool having its cutting edges projecting from a plane face in continuous intermeshing engagement with a continuously rotating gear blank while imparting a relative rolling movement continuously in one direction between the tool and blank in the manner of a gear rolling with its mating gear with its axis offset from the axis of said mate gear.

7. The method of producing the teeth of a gear which consists in rotating a tool having its cutting edges projecting from a plane face in engagement with a gear blank while imparting a relative rolling movement between tool and blank in the manner of a gear rolling with its mate gear with its axis offset from the axis of the mate gear.

8. The method of producing gear teeth which consists in moving a tool in a curved path across the face of a gear blank while rotating the blank on its axis and simultaneously imparting an added relative movement between tool and blank about a separate axis offset from the blank axis.

9. The method of producing gear teeth which consists in rotating a tool, having annularly arranged cutting portions, in engagement with a gear blank while rotating the blank on its axis and simultaneously imparting an added relative movement between tool and blank about an axis offset from the blank axis.

10. The method of producing the teeth of a gear which consists in moving a tool in a curved path across the face of a gear blank while imparting a relative rolling motion between the tool and blank in the manner of a gear rolling with its mate gear with its axis offset from the axis of the mate gear.

11. The method of producing a pair of hypoid gears which consists in producing one of said gears by moving a tool in a curved path across the face of a gear blank while rotating the blank on its axis and imparting an added relative movement between tool and blank about an axis offset from the blank axis, providing the mate gear with conjugate longitudinally curved teeth and proportioning said mate gears so that the two gears will mesh along the projection of the axis of one gear into a plane tangent to the pitch surfaces of both at a mean contact point.

12. The method of producing a pair of hypoid gears which consists in producing the tooth surfaces of one of said gears by moving a tool in a curved path across the face of a gear blank while rotating the blank on its axis and imparting an added relative movement between tool and blank about an axis offset from the blank axis, providing the mate gear with conjugate longitudinally curved teeth and proportioning said mate gear so that the teeth of the gears in mesh will contact along the entire tooth surface of one gear.

13. The method of producing a pair of hypoid gears which consists in producing the tooth surfaces of one of said gears by moving a tool in a curved path across the face of a gear blank while rotating the blank on its axis and imparting an added relative movement between tool and blank about an axis offset from the blank axis, providing the mate gear with conjugate longitudinally curved teeth and proportioning said gears so that the tooth spaces of one of said gears are substantially as wide along the whole tooth space as the teeth of the mating gear are thick.

14. The method of producing a pair of hypoid gears which consists in forming the tooth surfaces of one of said gears by moving a cutting edge in a curved path across the face of a gear blank while maintaining said edge in line contact with the finished tooth surface of the gear, and producing the other gear by moving a tool, representing a tooth surface of the first gear, in a curved path across the face of a gear blank while imparting a relative rolling movement between said blank and tool in the manner of a gear meshing with the first gear with its axis non-intersecting and non-parallel to the axis of the first gear, and proportioning the two gears so as to secure contact along the entire tooth surface of one gear.

15. The method of producing a pair of hypoid gears which consists in forming the tooth surfaces of one of said gears by moving a cutting edge in a curved path across the face of a gear blank while maintaining said edge in line contact with the finished tooth surface of the gear, and producing the other gear by moving a cutting edge, representing a tooth surface of the first gear, in a curved path across the face of a gear blank while imparting a relative rolling movement between said blank and cutting edge in the manner of a gear meshing with the first gear with its axis non-intersecting and non-parallel to the axis of the first gear, and proportioning the two gears so that the tooth spaces of one of said gears will be substantially as wide along the whole tooth space as the teeth of the mating gear are thick.

16. The method of producing a pair of hypoid gears which consists in forming the tooth surfaces of one of said gears by moving a cutting edge in a curved path across the face of a gear blank while maintaining said edge in line contact with the finished tooth surface of the gear, and producing the other gear by moving a cutting edge, representing a tooth surface of the first gear, in a curved path across the face of a gear blank while imparting a relative rolling movement between said blank and cutting edge in the manner of a gear meshing with the first gear with its axis non-intersecting and non-parallel to the axis of the first gear, and proportioning the two gears so that they will mesh along the projection of the axis of one gear in a plane tangent to the pitch surfaces of both at a mean contact point.

ERNEST WILDHABER.